United States Patent
Tarananopas (10) Patent No.: US 10,337,190 B2
(45) Date of Patent: Jul. 2, 2019

(54) BOARD WITH TONGUE AND TENON AND METHOD FOR MANUFACTURE OF SAID BOARD WITH TONGUE AND TENON

(71) Applicant: Ranat Tarananopas, Patumthani (TH)

(72) Inventor: Ranat Tarananopas, Patumthani (TH)

( * ) Notice: Subject to any disclaimer, the term of this patent is extended or adjusted under 35 U.S.C. 154(b) by 0 days.

(21) Appl. No.: 16/058,919

(22) Filed: Aug. 8, 2018

(65) Prior Publication Data

US 2019/0048594 A1 Feb. 14, 2019

(51) Int. Cl.
| | |
|---|---|
| *B27F 1/02* | (2006.01) |
| *E04F 13/08* | (2006.01) |
| *B32B 3/06* | (2006.01) |
| *B32B 21/14* | (2006.01) |
| *B32B 21/02* | (2006.01) |
| *E04F 15/02* | (2006.01) |

(52) U.S. Cl.
CPC ............ *E04F 13/0894* (2013.01); *B27F 1/02* (2013.01); *B32B 3/06* (2013.01); *B32B 21/02* (2013.01); *B32B 21/14* (2013.01); *E04F 15/02038* (2013.01); *B32B 2419/00* (2013.01); *B32B 2471/00* (2013.01); *B32B 2607/00* (2013.01); *E04F 2201/0153* (2013.01); *E04F 2201/023* (2013.01); *E04F 2201/043* (2013.01)

(58) Field of Classification Search
CPC ... E04F 13/0894; E04F 15/02038; B27F 1/02; B32B 21/02
See application file for complete search history.

(56) References Cited

U.S. PATENT DOCUMENTS

| | | | | |
|---|---|---|---|---|
| 4,807,677 A | * | 2/1989 | Rottmann | B23Q 7/035 144/245.2 |
| 5,813,137 A | * | 9/1998 | Townsend | B27C 5/00 248/346.01 |
| 6,209,278 B1 | * | 4/2001 | Tychsen | E04F 15/04 52/592.1 |
| 6,216,409 B1 | * | 4/2001 | Roy | E04F 13/08 52/588.1 |
| 6,766,622 B1 | * | 7/2004 | Thiers | E04F 15/04 52/591.3 |

(Continued)

FOREIGN PATENT DOCUMENTS

| | | |
|---|---|---|
| EP | 1084317 B2 | 9/2008 |
| WO | 1994026999 A1 | 11/1994 |
| WO | 1996027721 A1 | 9/1996 |

*Primary Examiner* — Paola Agudelo
(74) *Attorney, Agent, or Firm* — Kim IP Law Group PLLC (57) ABSTRACT

This invention relates to a board with tongue and tenon and method for manufacture of the board with tongue and tenon. Board with tongue and tenon, which can be joined together without using other tools, comprises a hard board having a rectangular shape having a top side, a bottom side, a first lateral side opposite to and parallel with a second lateral side and perpendicular to a third lateral side opposite to and parallel with a fourth lateral side, the first lateral side and the third lateral side having a male connector thereon and the second lateral side and the fourth lateral side having a female connector thereon, characterized in that said insertion of the male connector into the female connector moves along a curve which is a part of a first ellipse; a second ellipse; and a third ellipse, wherein the first ellipse, the second ellipse, and the third ellipse are concentric.

17 Claims, 6 Drawing Sheets

(56) References Cited

U.S. PATENT DOCUMENTS

| | | | | |
|---|---|---|---|---|
| 7,698,868 B2* | 4/2010 | Moriau | ............... | B27F 1/06 |
| | | | | 52/588.1 |
| 2005/0160694 A1* | 7/2005 | Pervan | ............... | B27F 1/02 |
| | | | | 52/582.1 |
| 2010/0154935 A1* | 6/2010 | Dammers | ............ | B27F 1/02 |
| | | | | 144/371 |
| 2014/0000197 A1* | 1/2014 | Pervan | ............... | B27N 3/04 |
| | | | | 52/309.1 |
| 2014/0283466 A1* | 9/2014 | Boo | ............ | E04F 15/02038 |
| | | | | 52/105 |

* cited by examiner

BOARD WITH TONGUE AND TENON AND METHOD FOR MANUFACTURE OF SAID BOARD WITH TONGUE AND TENON

CROSS-REFERENCE TO RELATED APPLICATIONS

This application claims foreign priority, pursuant to 35 U.S.C. § 119, to Thai Patent Application No. 1701005127, filed Aug. 8, 2017, the entire disclosure of which is incorporated by reference herein in its entirety.

FIELD OF THE INVENTION

This invention relates to a board with tongue and tenon and method for manufacture of said board with tongue and tenon.

The present invention involves forming male connectors and female connectors on the opposite sides on all four sides of two or more hard boards which are referred to as board with tongue and tenon such that they can be joined to form a larger board with tongue and tenon. The joining is carried out by inserting a tongue and a tenon into a tongue groove and a tenon groove respectively such that they are tightly joined without using adhesive and nails and other equipment for joining.

SUMMARY OF THE INVENTION

The objective of the present invention is to provide a hard board that can be joined with each other easily and tightly without using adhesive, nails, and any other equipment for joining for utility in applications as floor tiles, wall panels, ceiling boards, finger joint laminated wood in furniture, and the like.

To achieve the above objective, the present invention provides a board with tongue and tenon comprising a rectangular hard board having a top side, a bottom side, a first lateral side opposite to and parallel with a second lateral side and perpendicular to a third lateral side opposite to and parallel with a fourth lateral side, the first lateral side and the third lateral side having a male connector thereon and the second lateral side and the fourth lateral side having a female connector thereon wherein the male connector protrudes from longitudinal lateral sides of the first side and the third side of the hard board and comprises a tongue, a tenon, a male connector upper edge surface, a male connector lower edge surface, and a male connector lower inner surface; the tongue having a tongue upper surface, a tongue end surface, a tongue lower surface, a tongue upper base corner formed by a convergence of the male connector upper edge surface and the tongue upper surface, and a tongue lower end corner formed by a convergence of the tongue end surface and the tongue lower surface; the tenon having a tenon outer surface, a tenon inner contact surface, a tenon inner base corner formed by a convergence of the tenon inner contact surface and the male connector lower inner surface, and a tenon lowermost end formed by a convergence of the tenon outer surface and the tenon inner contact surface, the tenon lowermost end being lower than the tongue lower surface and higher than the bottom side of the hard board; the male connector upper edge surface extending upward from the tongue upper surface to the top side of the hard board; the tongue lower surface extending upward from the bottom side of the hard board to the male connector lower inner surface; and the male connector lower inner surface being located between the tenon inner base corner and the male connector lower edge surface;

the female connector protrudes from longitudinal lateral sides of the second side and the fourth side of the hard board forming an upper edge and a lower edge and comprises a tongue groove, a tenon groove, a female connector upper edge surface, a female connector lower edge surface, and a female connector outer edge surface; the tongue groove having a tongue groove upper surface, a tongue groove end surface, and a tongue groove lower surface; the tenon groove having a tenon groove inner surface, a tenon groove outer contact surface, a tenon groove outer base corner formed by a convergence of the tenon groove outer contact surface and the female connector outer edge surface, and a tenon groove lowermost end formed by a convergence of the tenon groove inner surface and the tenon groove outer contact surface, the tenon groove lowermost end being lower than the tongue groove lower surface and higher than the bottom side of the hard board; the female connector upper edge surface extending upward from the tongue groove upper surface to the top side of the hard board; the female connector lower edge surface extending upward from the bottom side of the hard board to the female connector outer edge surface; the female connector outer edge surface being located between the tenon groove outer base corner and the female connector lower edge surface;

at least two board with tongue and tenon can be joined by horizontally laying a first said board with tongue and tenon and inserting a second said board with tongue and tenon wherein the male connector of the second said board with tongue and tenon is inclined and inserted into the female connector of the first said board with tongue and tenon such that the top sides of the first said board with tongue and tenon and the second said board with tongue and tenon flush when they are tightly joined;

characterized in that said insertion of the male connector into the female connector moves the tongue upper base corner along a curve which is a part of a first ellipse (E1); moves the tongue lower end corner along a curve which is a part of a second ellipse (E2); and moves the tenon lowermost end or the tenon inner contact surface while in contact with the tenon groove outer contact surface (38) along a curve which is a part of a third ellipse (E3) wherein the first ellipse (E1), the second ellipse (E2), and the third ellipse (E3) are concentric.

In addition, the present invention provides a method for manufacture of the board with tongue and tenon by forming the tenon groove on the hard board using a first cutting tool set and forming the tongue groove using a second cutting tool set which is independent from the first cutting tool set wherein the first cutting tool set's shafts are horizontally oriented and the second cutting tool set's shafts are vertically oriented. These and other objectives will become apparent from the description of the preferred embodiment of the present invention and claims as follows.

BACKGROUND OF THE INVENTION

In preparation of wall panels, ceiling boards, floor tiles, or planks for large furniture, widely used conventional methods are joining small hard boards to form a larger plank as desired using adhesive and/or nails which is complicated and requires tool for lamination, or tongue insertion carried out by forming a tongue and a tongue groove and joining using adhesive for horizontal fixing, scarfing, overlapping, pinning, using additional equipment for fixing, and other approaches for achieving said objective. Examples of limitation as shown in prior art patents are as follows.

Examples of hard boards with engaging parts include the inventions as described in the U.S. Pat. No. 6,766,622 B1 and U.S. Pat. No. 7,698,868 B2 disclosing hard boards having engaging parts for fixing without using additional equipment, International Patent Application Publication No. WO1994026999 A1 and International Patent Application Publication No. WO1996027721 A1 disclosing hard boards having engaging parts for fixing using additional equipment, European Patent No. EP 1084317 B2 disclosing hard boards having engaging parts for fixing with slight modification or addition in the engaging parts e.g. contact surface angle and thickness, U.S. Pat. No. 6,209,278 B1 and U.S. Pat. No. 6,216,409 B1 disclosing hard boards having engaging parts for fixing wherein the engaging parts were configured into two zig-zag grooves being in contact and complementary to each other, and the like. However, the hard boards according to said inventions often have limitations in use or manufacture as follows.

- The hard board must have a firm shape, straight and planar surfaces, a uniform thickness across the board, and particularly a flexibility property as joining the hard boards requires spreading and closing in of the male connector and the female connector for engagement. Therefore, the material used preferably have a high flexibility, a thickness of about 3-12 mm, and is not susceptible to crack or breakage. This type of hard board is therefore preferably produced from a flexible hard board formed by industrial processed into flat board e.g. plastic boards, wood-plastic composite boards, plywood boards, HDF (High Density Fiber), MDF (Medium Density Fiber) hard boards, or PBs (Particle Board), and the like.
- The engagement of the male connector and the female connector requires specifying a reference point and rotating the male connector about said reference point in circle with said reference point as the center thereof until an obstacle is reached. Then the female connector is spread and closing in for engagement. In some cases, additional equipment produced for other industries may be used to facilitate the engagement. With the circumferential rotation of the male connector, the joining of the male connector and the female connector is tight but a spread-and-close engagement is caused. One disadvantage of this principle is the loss of flexibility property occurring when disassemblies and reassemblies are carried out which means that further engagements will be loose.
- For flexibility in the engagement and for a stable fixation of the hard boards, the hard board's thickness must be not too high or too low and normally in a range of 3 millimeters to 12 millimeters and
- The machine used in manufacture requires a motor shaft for fitting a cutting tool for an angle-adjustable forming which is costly and requires complicated work setting which may result in inaccurate and defected products.

However, none of the patents and publications disclosed an invention which provides a hard board which has no flexibility, no thickness limitation, no limitation in the types of material e.g. iron, and particularly lumber; applies the principle of moving along the circumferences of three ellipses of the male connector without requiring flexibility property for spreading and closing in the engaging parts; can be assembled easily without using adhesive and nails and any additional equipment; and can be disassembled and reassembled as many times as desired without losing horizontal and vertical fixing property.

BRIEF DESCRIPTION OF THE DRAWINGS

Specific embodiment of the present invention will be described below in an exemplary manner with reference to accompanying drawings which may not be of actual sizes. The drawings is to illustrate the subject matter of the present invention as well as other preferred different aspects of the present invention. However, the specific embodiment does not limit the scope of possible aspects of the present invention.

DETAILED DESCRIPTION OF THE INVENTION

The present disclosure specifically describes the subject matter for patenting in order to comply with provisions of the law. However, the present description is not intended to limit the scope of the present disclosure. The principle described herein can be applied in various other manners.

The board with tongue and tenon generally means a forming edge(s) of a hard board (1) to obtain a board with tongue and tenon (2).

Figures 1, 2:
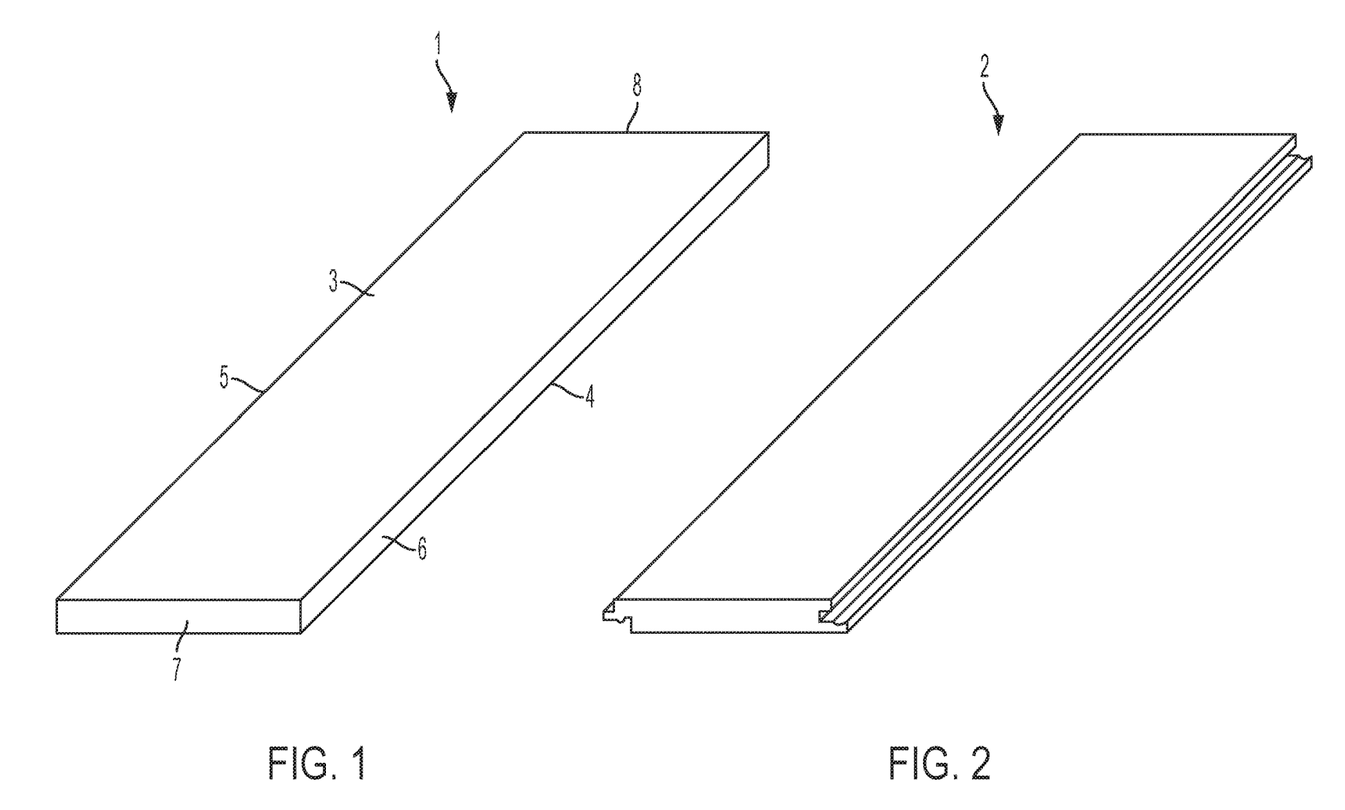
FIG. 1 shows a hard board according to the preferred embodiment of the present invention.
FIG. 2 shows a board with tongue and tenon.

Said hard board (1) means any materials which have solidity due to its density, have a cubic shape, i.e. having the dimensions of thickness, width, and length as parallel and opposite planes and connected perpendicular planes, i.e. having a rectangular or square shapes with different thickness as desired; which may be of single material or a composite. The hard board (1) includes an top side (3), a bottom side (4), a first lateral side (5) opposite to and parallel with a second lateral side (6) and perpendicular to a third lateral side (7) opposite to and parallel with a fourth lateral side (8), the first lateral side (5) and the third lateral side (7) having a male connector (9) thereon and the second lateral side (6) and the fourth lateral side (8) having a female connector (10) thereon.

The thickness of the hard board (1) is not limited and its flexibility is not required which solve the limitations of the prior art. The hard board (1) is made of materials selected from the group consisting of plastic, plywood, lumber, finger joint laminated board, woodchip, hardboard, wood-plastic composite, non-metal and metal. For example, hard boards with no flexibility property such as lumber boards, finger joint laminated boards; and hard boards with flexibility property such as particle boards or hardboards, plywood boards, plastic boards, wood-plastic composite boards, and the like with the above-mentioned properties as well as metal or non-metal plates formed according to the shapes and principles of the present invention can be tightly assembled according to this objective.

FIG. 1 shows the hard board according to the embodiment provided in the present invention comprising the hard board (1) having a rectangular or square shape with any thickness made from a hard board with a firm shape e.g. plastic boards, wood-plastic composite boards, fiber cement boards, plywood boards, hardboard; or a hard board with an unfirm shape e.g. lumber. The hard board (1) is formed on a conveyor belt into the board with tongue and tenon having the top side (3) in parallel with the bottom side (4), the first lateral side (5) in opposite to and in parallel with the second lateral side (6), and the third lateral side (7) in opposite to and in parallel with the fourth lateral side (8), and the ends of all four sides connected to form right angles. Opposite sides are formed into the male connector (9) and the female connector (10) to obtain the board with tongue and tenon (2). Two identical board with tongue and tenon (2) can be joined by pairing the male connector (9) with the female connector (10) as shown in FIG. 3 without using adhesive and/or nails and addition equipment for fixing them and can be detached and reused without deformation.

FIG. 2 shows the male connector (9) and the female connector (10) of the board with tongue and tenon (2) obtained from forming the hard board (1).

Figure 3:
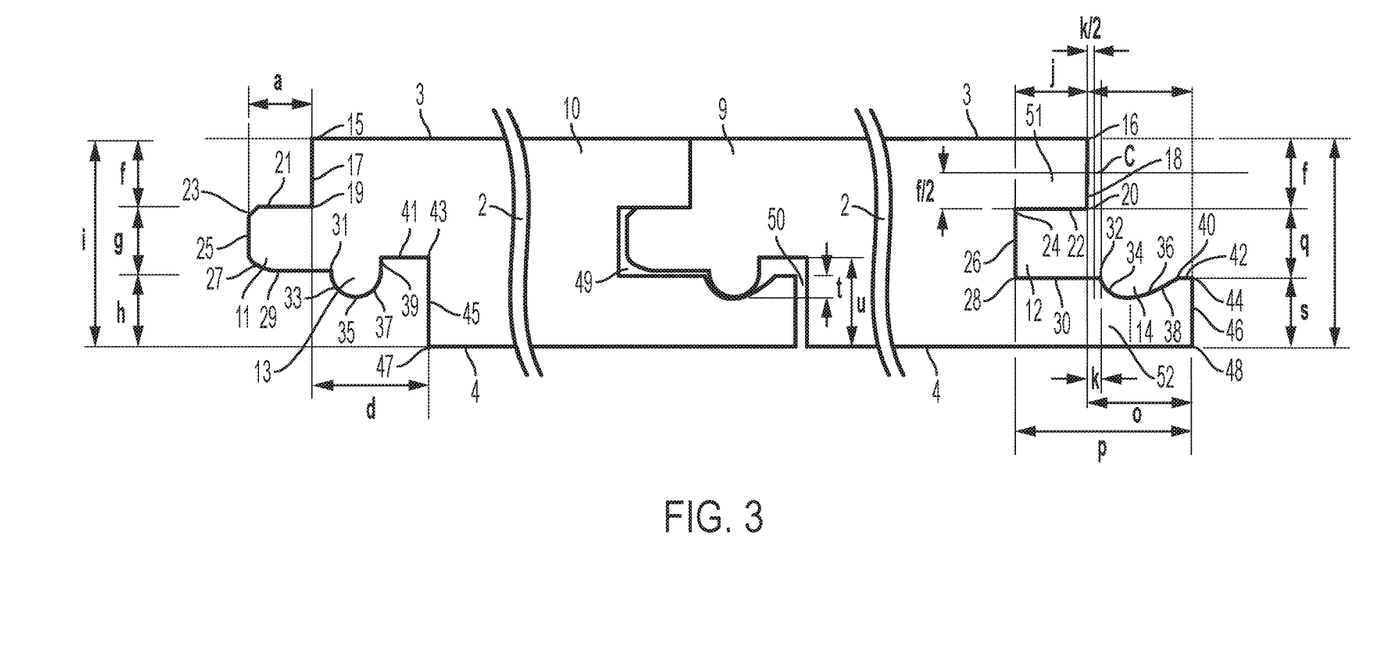
FIG. 3 shows a sectional view of two assembled board with tongue and tenon.

FIG. 3 shows the engaging parts of two board with tongue and tenon (2) according to the embodiment and principle of the invention comprising the pairing of a tongue rail set and a tenon rail set on the male connector (9) and the female connector (10). The tongue rail set comprises the tongue (11) and the tongue groove (12) which retain the paired board with tongue and tenon in a plane and prevent their vertical separation. The tenon rail set comprises the tenon (13) and the tenon groove (14) configured to correspond with the tongue rail set which retain the paired board with tongue and tenon (2) and prevent them from horizontal separation and tightly fix them without a space therebetween.

The male connector (9) protrudes from the longitudinal lateral sides of the first side (5) and the third side (7) of the hard board (1) and mainly comprises the male connector upper edge surface (17), the tongue (11), the tenon (13), the male connector lower inner surface (41), and the male connector lower edge surface (45).

The male connector upper edge surface (17) is vertically formed with a horizontal distance (referred to as "the tongue's length") "a" from the tongue end surface (25), with a horizontal distance "d" from the male connector lower edge surface (45); and defines an upward vertical distance (referred to as "the upper edge's height") "f" from the tongue upper surface (21) to the top side (3) of the hard board (1); and define the male connector upper edge corner (15) by a convergence of the male connector upper edge surface (17) and the top side (3) of the hard board (1).

The tongue (11) protrudes from the first lateral side (5) and the third lateral side (7) of the hard board (1) for a distance "a" longitudinally and in opposite direction to the tongue groove (12) for insertion into the tongue groove (12) to horizontally define the tongue upper surface (21), to vertically define the tongue end surface (25), and to horizontally define the tongue lower surface (29) with a vertical distance (referred to as "the tongue's thickness") "g" from the tongue upper surface (21) and with a vertical distance (referred to as "the tongue's height") "h" from the bottom side (4) to define the tongue upper base corner (19) by the convergence of the male connector upper edge surface (17) and the tongue upper surface (21), to define the tongue upper end corner (23) by the convergence of the tongue end surface (25) and the tongue upper surface (21), and to define the tongue lower end corner (27) by the convergence of the tongue end surface (25) and the tongue lower surface (29). The tongue upper end corner (23) and the tongue lower end corner (27) may be configured to be an inclined plane by e.g. chamfering for aesthetic purpose and particularly for containing the tongue lower end corner (27) in the ellipse E2.

The tenon (13) is formed to vertically convexly protrudes downward between the tongue lower surface (29) and the male connector lower inner surface (41) with a horizontal, longitudinal distance "d" in parallel with the tongue (11) for insertion into the tenon groove (14) to define the tenon outer surface (33) and the tenon inner contact surface (37). The tenon outer base corner (31) is defined by the convergence of the tenon outer surface (33) and the tongue lower surface (29). The tenon inner base corner (39) is formed by the horizontal convergence of the tenon inner contact surface (37) and the male connector lower inner surface (41) and the tenon lowermost end (35) is defined by the convergence of the tenon outer surface (33) and the tenon inner contact surface (37) wherein the tenon lowermost end (35) is lower than the tongue lower surface (29) and higher than the bottom side (4).

The male connector lower inner surface (41) is horizontally formed from the tenon inner base corner (39) to the male connector lower edge surface (45) which is vertically formed upward from the bottom side (4) with a vertical distance (referred to as "the lower edge's height") "u" to the male connector lower inner surface (41). A male connector lower edge upper corner (43) is defined by the convergence of the male connector lower edge surface (45) and the male connector lower inner surface (41) and a male connector lower edge lower corner (47) is defined by the convergence of the male connector lower edge surface (45) and the bottom side (4).

The female connector (10) protrudes from the longitudinal lateral sides of the second side (6) and the fourth side (8) of the hard board (1) to define the upper edge (51) and the lower edge (52) and mainly comprises the female connector upper edge surface (18), the tongue groove (12), the tenon groove (14), the female connector outer edge surface (42), and the female connector lower edge surface (46).

The female connector upper edge surface (18) is vertically formed with a horizontal distance (referred to as "the tongue groove's depth") "j" from the tongue groove end surface (26), with a horizontal distance "o" from the female connector lower edge surface (46) and formed upward from the tongue groove upper surface (22) with a vertical distance (referred to as "the upper edge's height") "f" to the top side (3) to define the female connector upper edge corner (16) by the convergence of the female connector upper edge surface (18) and the top side (3). The height of the female connector upper edge surface (18) is equal to the height of the male connector upper edge surface (17) so that the top sides (3) flush in tight pairing.

The tongue groove (12) means the parts concavely indented from the second lateral side (6) and the fourth lateral side (8) using trimming at a lateral side for a distance "p" into a longitudinal groove in opposite direction to the side of the tongue (11) for insertion of the tongue (11). The tongue groove (12) is formed to define the upper edge (51) and the lower edge (52) wherein the lower edge (52) is longer than the upper edge (51) for a distance "o" to be used to form the tenon groove (14) to horizontally define the tongue groove upper surface (22), to vertically define the tongue groove end surface (26), and to horizontally define the tongue groove lower surface (30) with a vertical distance (referred to as "the tongue groove's width") "q" from the tongue groove upper surface (22) and with a vertical distance (referred to as "the lower edge's height") "s" from the bottom side (4). The tongue groove upper base corner (20) is defined by the convergence of the female connector upper edge surface (18) and the tongue groove upper surface (22). A tongue groove upper end corner (24) is defined by the convergence of the tongue groove end surface (26) and the tongue groove upper surface (22) and a tongue groove lower end corner (28) is defined by the convergence of the tongue groove end surface (26) and the tongue groove lower surface (30).

The tenon groove (14) is formed to interact with the tenon (13) by trimming the lower edge (52) to be concavely indented longitudinally in parallel with longitudinal direction of the tongue groove (12) for insertion of the tenon (13) to define the tenon groove inner surface (34), the tenon groove outer contact surface (38), a tenon groove inner base corner (32) with a vertical distance "k" from the female connector upper edge surface (18), the tenon groove outer base corner (40), the horizontal female connector outer edge surface (42), and the tenon groove lowermost end (36) defined by the convergence of the tenon groove inner surface (34) and the tenon groove outer contact surface (38). The tenon groove lowermost end (36) is lower than the tongue groove lower surface (30) for a vertical distance (referred to as "the tenon groove's depth") "t" and higher than the bottom side (4) of the hard board (1) for a vertical distance (referred to as "the tenon groove's height") of s-t.

The female connector outer edge surface (42) may be horizontally formed or configured as a curved surface from the tenon groove outer base corner (40) to the female connector lower edge surface (46). The female connector lower edge surface (46) is formed to vertically extend upward from the bottom side (4) to the female connector outer edge surface (42) for a vertical distance (referred to as "the lower edge's height") "s" and to define a female connector lower edge upper corner (44) by the convergence of the female connector lower edge surface (46) and the female connector outer edge surface (42) and the female connector lower edge lower corner (48) by the convergence of the female connector lower edge surface (46) and the bottom side (4).

According to the present invention, the term "interact" means a fit insertion of the tongue (11) into the tongue groove (12) and of the tenon (13) into the tenon groove (14) without obstruction, without spreading and closing in of the lower edge (52) for engagement with the tenon (13).

In case the hard board (1) is made from a hard board having an unfirm shape e.g. lumber, the above-mentioned distances are particularly required to take into account the contraction and expansion of its material as well as chip produced in manufacturing processes which may remain in the pairing parts. That is to say, said distances should be adjusted to leave sufficient spaces between the male connector (9) and the female connector (10) which should not exceed 2 millimeters for accommodating said contraction and expansion and chipping. For example, vertical and horizontal spaces between tongue rail set (49) may be provided by specifying the distance "j" of the tongue groove (12) to be longer than the distance "a" of the tongue (11) (j>a) and/or the width of the tongue groove (12) "q" may be specified to be longer than the thickness of the tongue (11) "g" (q>g) or vertical and horizontal spaces between tenon rail set (50) may be provided by specifying the lower edge's height "u" of the male connector (9) to be more than the lower edge's height "s" of the female connector (10) (u>s) and a small space may be provided between the male connector lower edge surface (45) and the female connector lower edge surface (46) or the tenon groove inner surface (34) may be configured not to be in contact with the tenon outer surface (33) and the like.

FIG. 3 shows how to pair the board with tongue and tenon according to the preferred embodiment of the invention which comprises joining at least two board with tongue and tenon by inclining a second board with tongue and tenon (2) such that the male connector (9) forms an angle (θ) of normally not more than 10 degree, and inserting it into the female connector (10) of a first board with tongue and tenon (2) such that the top sides (3) of the hard boards of the assembled two board with tongue and tenon (2) flush when tightly joined. Said insertion of the male connector (9) into the female connector (10) begins from the point of contact of a part of the male connector upper edge surface (17) with the female connector upper edge corner (16) and of a part of the tongue upper surface (21) of the male connector (9) with the tongue groove upper base corner (20) of the female connector (10). Then the male connector (9) is pressed in the direction of the circumference of the ellipse to move the tongue upper base corner (19) along the circumference of the first ellipse (E1) until the male connector upper edge surface (17) contact the female connector upper edge surface (18). While the male connector (9) is being moved, a part of the male connector upper edge surface (17) is always in contact with the female connector upper edge corner (16), a part of the tongue upper surface (21) is always in contact with the tongue groove upper base corner (20) of the female connector (10), and the tenon lowermost end (35) and/or the tenon inner contact surface (37) is always in contact with the tenon groove outer contact surface (38) of the female connector (10). Until the male connector upper edge surface (17) comes in contact with the female connector upper edge surface (18), a part of the tenon inner contact surface (37) is in contact with a part of the tenon groove outer contact surface (38), the male connector upper edge corner (15) is in contact with the female connector upper edge corner (16), the tongue upper surface (21) is in contact with the tongue groove upper surface (22), the tenon lowermost end (35) may be above or in contact with the tenon groove lowermost end (36) and/or the tenon inner contact surface (37) is in contact with the tenon groove outer contact surface (38) and the top side (3) of the first board with tongue and tenon (2) and the hard board of the second board with tongue and tenon (2) are coplanar and tightly joined.

Figure 4:
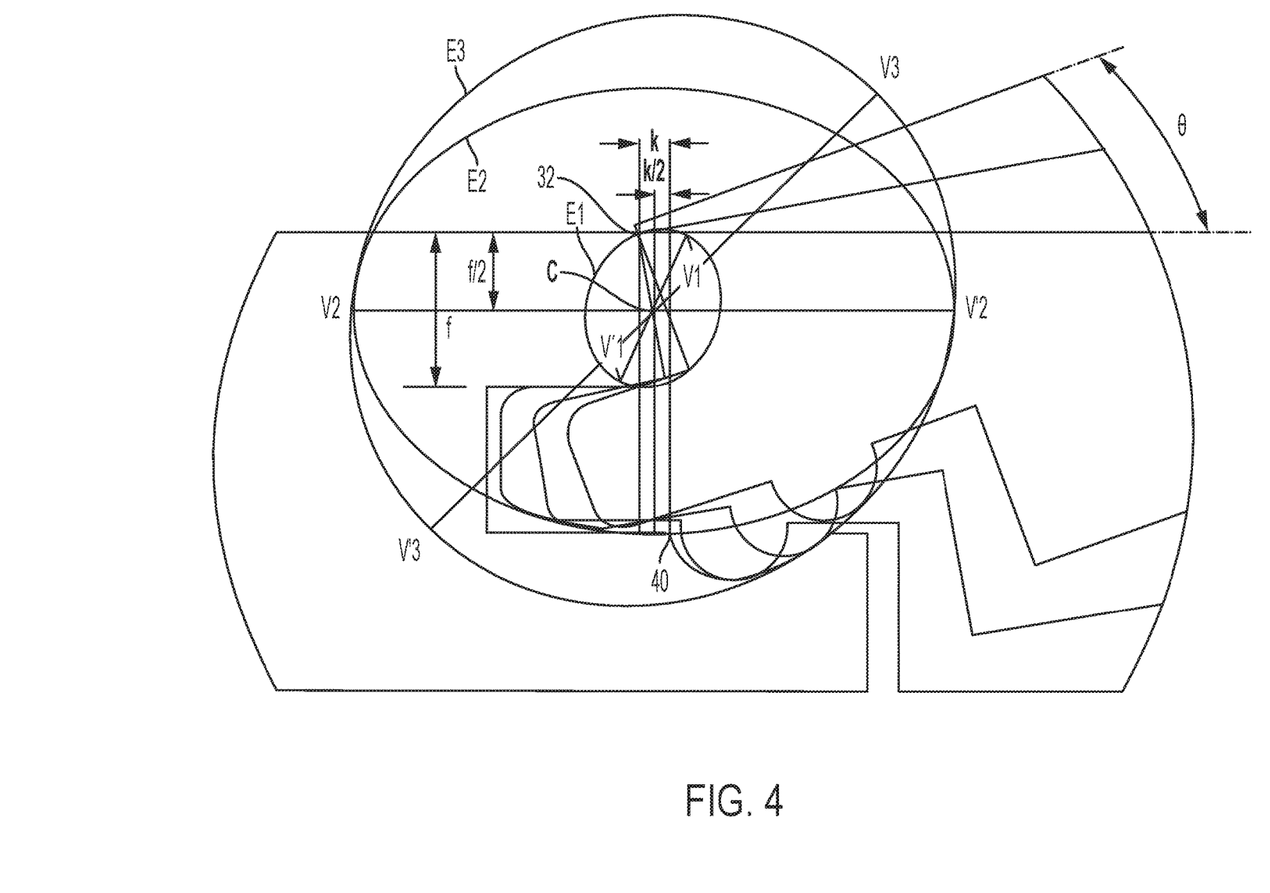
FIG. 4 shows the principle of moving along the circumferences of three ellipses of two board with tongue and tenon in assembly.

Said insertion of the male connector (9) into the female connector (10) moves the tongue upper base corner (19), the tongue lower end corner (27), and the tenon lowermost end (35) or the tenon inner contact surface (37) along the circumference of the first ellipse (E1), the second ellipse (E2), and the third ellipse (E3) respectively wherein the first ellipse (E1), the second ellipse (E2), and the third ellipse (E3) are concentric, that is to say:

the tongue upper base corner (19) is moved along a curve which is a part of the first ellipse (E1) having its major axis between positions V1 and V'1, the tongue lower end corner (27) is moved along a curve which is a part of the second ellipse (E2) having its major axis between positions V2 and V'2, and the tenon lowermost end (35) or the tenon inner contact surface (37) is moved while in contact with the tenon groove outer contact surface (38) along a curve which is a part of the third ellipse (E3) having its major axis between positions V3 and V'3 wherein at least a part of the tenon groove outer contact surface (38) is a part of the third ellipse (E3), the center (C) of the first ellipse (E1), the second ellipse (E2), and the third ellipse (E3) is positioned at the intersection of the horizontal line bisecting the distance "f" (distance f/2) and the vertical line bisecting the distance "k" (distance k/2) of the female connector (10).

Usually, the tongue upper end corner (23) and the tongue lower end corner (27) may be formed by chamfering to obtain a curved or inclined surface to prevent obstruction in the insertion of the male connector (9) into the female connector (10) and to enable a slight increase of the thickness (distance "g") and the length (distance "a") such that the strength of the tongue (11) is increased. In the above-mentioned insertion of the male connector (9) into the female connector (10), the tongue lower end corner (27) formed into a curved or inclined surface is moved along the curve in the second ellipse (E2).

Spaces between the tongue end surface (25) and the tongue groove end surface (26) and between the tongue lower surface (29) and the tongue groove lower surface (30) may be provided for accommodating an expansion or for containing possible dust that may obstruct the insertion of the male connector (9) into the female connector (10).

By virtue of the principle of the insertion of the male connector (9) into the female connector (10) which moves the tongue upper base corner (19), the tongue lower end corner (27), and the tenon lowermost end (35) or the tenon inner contact surface (37) along the circumferences of the concentric first ellipse (E1), the second ellipse (E2), and the third ellipse (E3) having different focal distances and major axes wherein the sizes of the first ellipse (E1), the second ellipse (E2), and the third ellipse (E3) are directly proportional to the thickness and size of the board with tongue and tenon (2), the male connector (9) and the female connector (10) of the board with tongue and tenon can be designed differently, have sufficient compressive strength along the circumference of the ellipses and tensile strength for tightly fixing at least two board with tongue and tenon (2) as illustrated in FIGS. 5-16 and the like.

Figure 5:
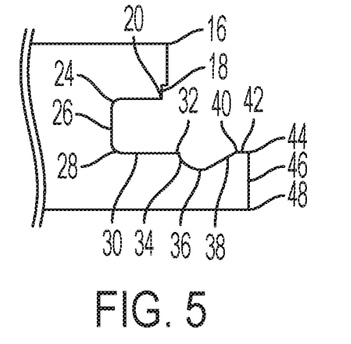
FIG. 5-10 show an aspect of modifications of the contour of the female connector of the board with tongue and tenon in FIG. 3.

FIG. 5-10 show modifications to the female connector (10) to be different from the female connector (10) according to FIG. 3. In FIG. 5, the lower portion of the female connector upper edge surface (18) adjacent to the tongue groove upper base corner (20) is slightly indented to define an internal space in case chip produced by manufacturing processes remains inside the pairing parts of the male connector (9) and the female connector (10). In addition, said indentation moves the horizontal position of the tongue groove upper base corner (20) deeper into the tongue groove (12) which raise the vertical position of the center (C) of the first ellipse (E1), the second ellipse (E2), and the third ellipse (E3) and also shift the motion of the male connector (9) upward which help in reducing friction generated during the insertion of the male connector (9) into the female connector (10).

Figure 6:
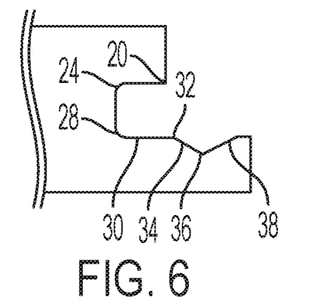

In FIG. 6, the tenon groove inner surface (34) is inclined and may come into contact with a part of the tenon outer surface (33) in some ways to help increasing strength for accommodating the tenon (13) when the male connector (9) and the female connector (10) are tightly paired.

Figure 7:
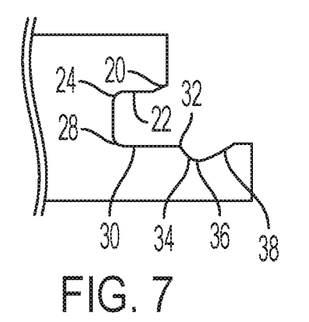

In FIG. 7, the tongue groove upper base corner (20) is indented from the female connector upper edge surface (18) and the tongue groove upper surface (22) and the tenon groove outer contact surface (38) is slightly convex to help reducing friction from the contact between the tongue (11) and the tongue groove (12) and between the tenon (13) and the tenon groove (14) during the insertion of the male connector (9) into the female connector (10).

Figure 8:
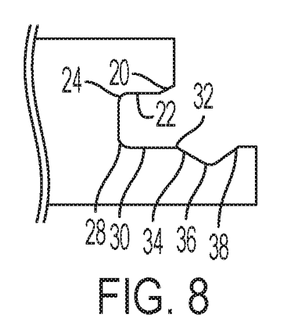

In FIG. 8, the tenon groove outer contact surface (38) is inclined to be tangential to the third ellipse (E3) and the tenon groove inner surface (34) is inclined and in contact with a part of the tenon outer surface (33) to help increasing strength for accommodating the tenon (13) when the male connector (9) and the female connector (10) are paired. The tongue groove upper base corner (20) is inclined to help reducing friction from the contact during the insertion of the male connector (9) into the female connector (10).

Figure 9:
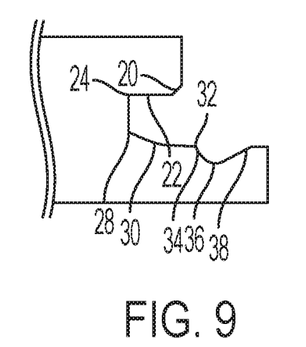

In FIG. 9, the tongue groove lower surface (30) is curved to be tangential or not tangential to the second ellipse (E2). The tongue upper base corner (19) is indented from the male connector upper edge surface (17) to contain dust and to ventilate possible humid.

Figure 10:
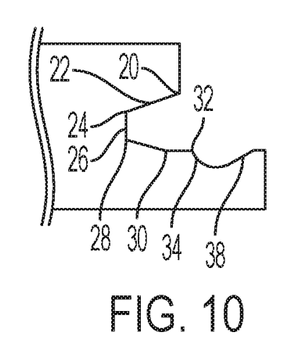

FIG. 10 is modified from FIG. 9 in that the tongue groove upper surface (22) of the female connector (10) is inclined. The modifications of the tongue groove lower surface (30) and the tongue groove upper surface (22) according to FIGS. 9 and 10 are still under the principle of the insertion of the male connector (9) into the female connector (10) to move the tongue upper base corner (19), the tongue lower end corner (27), and the tenon lowermost end (35) or the tenon inner contact surface (37) along the circumferences of the first ellipse (E1), the second ellipse (E2), and the third ellipse (E3) which are concentric.

Figure 11:
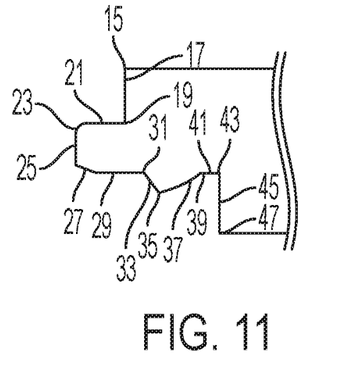
FIG. 11-16 show an aspect of modifications of the contour of the male connector of the board with tongue and tenon in FIG. 3.

FIG. 11-16 show modifications to the male connector (9) to be different from the male connector (9) according to FIG. 3. In FIG. 11, the tenon outer surface (33) is inclined and the tenon inner contact surface (37) is curved to be in line with the circumference of the third ellipse (E3) to make a contact between the tenon (13) and the tenon groove (14) only at the tenon inner contact surface (37) and the tenon groove outer contact surface (38) and to prevent obstruction caused by the tenon (13) and the tenon groove (14) while the male connector (9) and the female connector (10) are being tightly paired. A space may be provided between the tenon outer surface (33) and the tenon groove inner surface (34) but it must not obstruct the assembly in order to allow the top side (3) of each of the board with tongue and tenon to be fixed and to flush.

Figure 12:
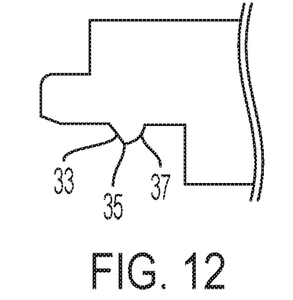

In FIG. 12, the tenon outer surface (33) is inclined such that the tenon (13) and the tenon groove (14) do not cause an obstruction while the male connector (9) and the female connector (10) are being tightly paired wherein the tenon lowermost end (35) or the tenon inner contact surface (37) is still moved along the circumference of the third ellipse (E3).

Figure 13:
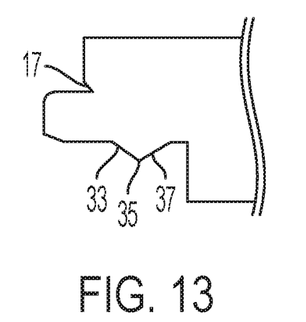

In FIG. 13, the tenon outer surface (33) and the tenon inner contact surface (37) is inclined such that the tenon (13) and the tenon groove (14) do not cause an obstruction and the tenon lowermost end (35) or the tenon inner contact surface (37) is still moved along the circumference of the third ellipse (E3).

Figure 14:
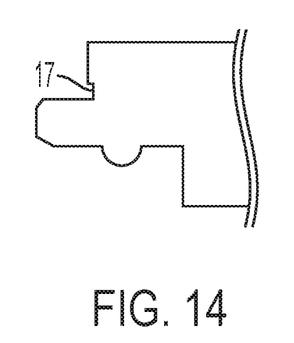

In FIG. 13 and FIG. 14, trimming may be carried out to slightly indent the male connector upper edge surface (17) to contain dust possibly produced in the manufacturing processes which does not depart from the subject matter of the principle of the present disclosure.

Figure 15:
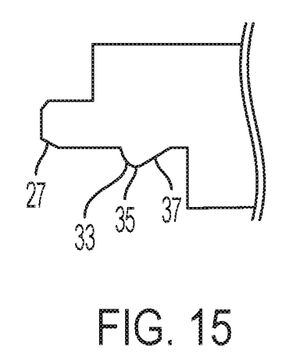

In FIG. 15, the tenon inner contact surface (37) is inclined wherein the tenon lowermost end (35) is still moved along the circumference of the third ellipse (E3).

Figure 16:
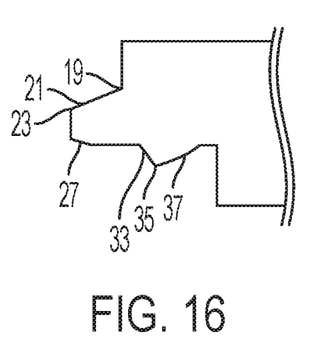

In FIG. 16, the tongue (11) and the tenon (13) are modified to correspond to and to be complementary with the tongue groove (12) and the tenon groove (14) of the female connector (10) according to FIG. 10 wherein the tongue upper surface (21) is inclined having the same angle with the inclined surface of the tongue groove upper surface (22) and the tenon inner contact surface (37) is curved to be in line with the tenon groove outer contact surface (38) and with the circumference of the third ellipse (E3). Therefore, the tongue upper surface (21) and the tongue groove upper surface (22) as well as the tenon inner contact surface (37) and the tenon groove outer contact surface (38) come into a fit contact while the male connector (9) and the female connector (10) are being tightly paired.

The purpose of the modification of the female connector (10) and the male connector (9) as shown in FIGS. 5-10 and FIGS. 11-16 respectively is to reduce contact and friction generated between the tongue (11) and the tongue groove (12) and between the tenon (13) and the tenon groove (14) during the insertion of the male connector (9) into the female connector (10) and to help pairing the male connector (9) and the female connector (10) tightly. However, the insertion of the male connector (9) into the female connector (10) requires the principle of moving the tongue upper base corner (19), the tongue lower end corner (27), and the tenon lowermost end (35) or the tenon inner contact surface (37) along the circumferences of the first ellipse (E1), the second ellipse (E2), and the third ellipse (E3) which are concentric. Therefore, any of the male connectors (9) and the female connectors (10) according to FIGS. 5-16 may be selected for suitable pairing to obtain the board with tongue and tenon according to the present invention. Furthermore, the configurations of the male connector (9) and the female connector (10) may be variously modified and configurations of the male connector (9) and the female connector (10) which do not cause an obstruction to each other may be selected for pairing as long as the principle of the insertion of both connectors along the circumferences of the first ellipse (E1), the second ellipse (E2), and the third ellipse (E3) which are concentric as described in the present invention is maintained.

The design of the board with tongue and tenon according to the present invention firstly mainly take into account the position of the tenon groove (14). According to FIG. 3, normally the height of the second lateral side (6) of the hard board (1) is roughly divided into 3 parts i.e. the upper edge's height (f), the tongue groove's width (q), and the lower edge's height (s) in a ratio suitable for the strength of the material used in manufacturing the hard board (1). Once the line of motion of the tenon lowermost end (35) or the tenon inner contact surface (37) along the circumference of the third ellipse (E3) is acquired, then the ratio between the upper edge's height (f), the tongue groove's width (q), and the lower edge's height (s) is readjusted while maintaining the line of motion of the tenon inner contact surface (37) to be in contact with the tenon groove outer contact surface (38). Then, a horizontal line is created at the level of the lower edge's height (s) to intersect with the third ellipse (E3) to acquire the position of the tenon groove outer base corner (40). Another horizontal line is created at the level of the tenon groove's depth (t) to intersect with the third ellipse (E3) to acquire the positions of the tenon groove lowermost end (36) and the tenon groove outer contact surface (38). Then a curve is created from the tenon groove lowermost end (36) to intersect with the horizontal line at the level of the lower edge's height (s) to acquire the positions of the tenon groove inner base corner (32) and the tenon groove inner surface (34).

The board with tongue and tenon according to the present invention can be manufactured by forming the hard board (1) using cutting tool sets mounted at different positions along the moving direction of a continuous manufacturing conveyor belt. The cutting tools used in forming said board with tongue and tenon (2) are configured as circular metal discs having a hole at the center for fitting a motor shaft therethrough and teeth regularly formed circumferentially on the edge of the metal discs. Normally, a metal disc preferably has 4 teeth, more preferably 6 teeth or more, on its edge; the radii from its center to the end of each tooth are equal; and its diameter is at least 5 times the thickness of the hard board (1). The diameter is preferably 120 millimeters or more. The motor's operation rotates the cutting tool in a high rate to trim the lateral side of the hard board (1) to form the configuration of the male connector (9) and the female connector (10) according to the present invention. The configuration of the cutting tool including the diameter of the disc, number of teeth, material of the teeth, and angle of the teeth which affects the trimming of the hard board (1), as well as rotation rate of the motor and the speed of the workpiece's conveyor belt are important to this method of manufacturing the board with tongue and tenon as all of them affect the quality and standardization of the manufactured board with tongue and tenon.

The design of the teeth used in trimming according to FIG. 16 may be different from the illustration depending on the desired results according to the principle as described above.

In manufacturing the board with tongue and tenon according to the present invention, the inventors found that complicated mountings of the cutting tool sets are not required i.e. all cutting tools can be mounted in fixed angles and in a vertical or horizontal orientation. Therefore, all manufactured board with tongue and tenon are accurate and standardized. In addition, the used tools' settings are quick, manufacturing cost is economical, and the product defects in manufacture is reduced.

All sides' plane of the hard board (1) may be leveled in advance by industrial manufacturing processes or leveled by the manufacturing process of the present invention. Then forming of the tenon groove (14) on the hard board (1) is performed by the first cutting tool set and forming of the tongue groove (12) is performed by the second cutting tool set which is independent from the first cutting tool set wherein the first cutting tool set's shafts are horizontally oriented and the second cutting tool set's shafts are vertically oriented.

Figure 17:
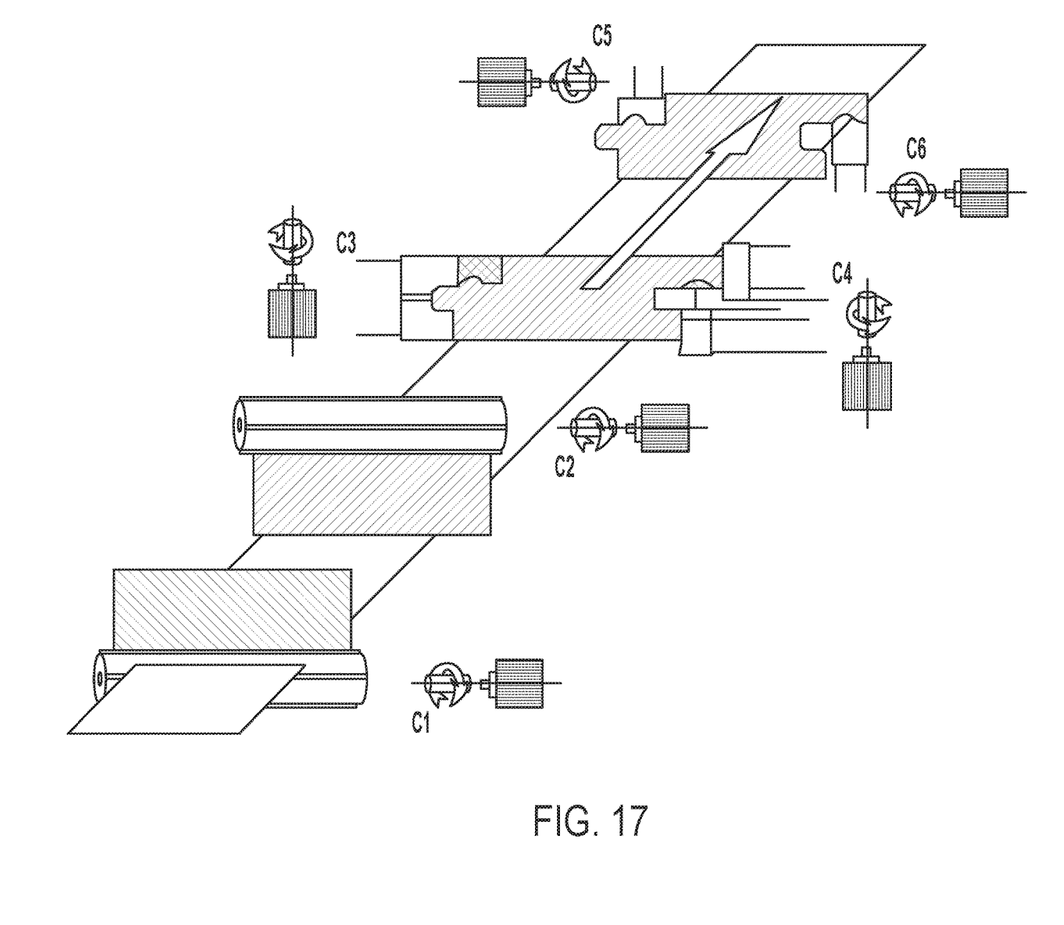
FIG. 17 shows a process for forming the board with tongue and tenon in FIG. 2 on a conveyor belt system using horizontal and vertical cutting tool sets fitted on motor shafts.

FIG. 17 shows an example of forming the board with tongue and tenon according to the present invention using 180 degree horizontal cutting tools (C1, C2, C5, and C6) and 90 degree vertical cutting tools (C3 and C4) fitted on motor shafts and mounted along a production conveyor belt. The hard board (1) is fed onto the production conveyor belt and pass through horizontal cutting tools C1 and C2. Both cutting tools level the hard board (1) to have smooth surfaces and uniform thickness. The leveled hard board (1) is carried on the belt to cutting tools C3 and C4 fitted on vertical motor shafts so that the first lateral side (5) of the hard board (1) is trimmed by the cutting tool C3 to form a flat surface on the male connector upper edge surface (17), the tongue upper surface (21), the tongue end surface (25), and the tongue lower surface (29) and the second lateral side (6) of the hard board (1) is trimmed by the cutting tool C4 to form the upper edge (51) and the lower edge (52) comprising the female connector upper edge surface (18), the tongue groove upper surface (22), the tongue groove end surface (26), and the tongue groove lower surface (30). Then the hard board (1) is moved to the cutting tools C5 and C6 fitted on horizontal motor shaft so that the first lateral side (5) of the hard board (1) is trimmed by the cutting tool C5 to form the tenon outer surface (33) and the tenon inner contact surface (37) and the male connector lower inner surface (41) and the male connector lower edge surface (45) and the second lateral side (6) of the hard board (1) is trimmed by the cutting tool C6 to form the tenon groove inner surface (34) and the tenon groove outer contact surface (38) and the female connector outer edge surface (42) and the female connector lower edge surface (46). In this regard, since the tenon groove inner base corner (32) is in a horizontal distance "k" from the female connector upper edge surface (18), the cutting tool C6 can trim and form the tenon groove (14) without contact with the female connector upper edge surface (18). The board with tongue and tenon (2) can be manufactured in desired width and length and distances as shown in FIG. 17 can be set by the same cutting tool set.

Said examples are only for describing the principle for forming using motor shafts oriented in 90 degree and 180 degree angles. In actual operation, the trimming methods may vary to obtain desired results under the principle of designing cutting tools according to material hardness, number of motors, and motor rotation rate. The board with tongue and tenon (2) can be manufactured in desired width and length and distances as shown in FIG. 17 can be set by the same cutting tool set.

According to the above disclosure, it is obvious to a person ordinarily skilled in the art that the present invention is not limited to examples as shown herein. Any material may be used to manufacture the board with tongue and tenon. The tongue rail set and the tenon rail set may be formed on all four sides of the hard board in a different order from that shown herein to allow the board with tongue and tenon to be joined after switching positions or to be rotated during installation. Configurations, sizes, and proportions of the male connector and the female connector may be modified from those defined in the specification without departing from the objective of the invention as disclosed and described herein. The scope of the invention covers the examples, embodiments, modifications, and equivalent variations as defined in the appended claims.

BEST MODE OF INVENTION

As mentioned in the detailed description of the invention.

| List of reference No. | |
|---|---|
| 1. hard board | 2. board with tongue and tenon |
| 3. top side | 4. bottom side |
| 5. first lateral side | 6. second lateral side |
| 7. third lateral side | 8. fourth lateral side |
| 9. male connector | 10. female connector |
| 11. tongue | 12. tongue groove |
| 13. tenon | 14. tenon groove |
| 15. male connector upper edge corner | 16. female connector upper edge corner |
| 17. male connector upper edge surface | 18. female connector upper edge surface |
| 19. tongue upper base corner | 20. tongue groove upper base corner |
| 21. tongue upper surface | 22. tongue groove upper surface |
| 23. tongue upper end corner | 24. tongue groove upper end corner |
| 25. tongue end surface | 26. tongue groove end surface |
| 27. tongue lower end corner | 28. tongue groove lower end corner |
| 29. tongue lower surface | 30. tongue groove lower surface |
| 31. tenon outer base corner | 32. tenon groove inner base corner |
| 33. tenon outer surface | 34. tenon groove inner surface |
| 35. tenon lowermost end | 36. tenon groove lowermost end |
| 37. tenon inner contact surface | 38. tenon groove outer contact surface |
| 39. tenon inner base corner | 40. tenon groove outer base corner |
| 41. male connector lower inner surface | 42. female connector outer edge surface |
| 43. male connector lower edge upper corner | 44. female connector lower edge upper corner |
| 45. male connector lower edge surface | 46 female connector lower edge surface |
| 47. male connector lower edge lower corner | 48. female connector lower edge lower corner |
| 49. space between tongue rail set | 50. Space between tenon rail set |
| 51. upper edge | 52. lower edge |

The invention claimed is:

1. A board with tongue and tenon comprising a hard board (1) having a rectangular shape having a top side (3), a bottom side (4), a first lateral side (5) opposite to and parallel with a second lateral side (6) and perpendicular to a third lateral side (7) opposite to and parallel with a fourth lateral side (8), the first lateral side (5) and the third lateral side (7) having a male connector (9) thereon and the second lateral side (6) and the fourth lateral side (8) having a female connector (10) thereon wherein the male connector (9) protrudes from longitudinal sides of the first lateral side (5) and the third lateral side (7) of the hard board (1) and comprises a tongue (11), a tenon (13), a male connector upper edge surface (17), a male connector lower edge surface (45), and a male connector lower inner surface (41); the tongue (11) having a tongue upper surface (21), a tongue end surface (25), a tongue lower surface (29), a tongue upper base corner (19) formed by a convergence of the male connector upper edge surface (17) and the tongue upper surface (21), and a tongue lower end corner (27) formed by a convergence of the tongue end surface (25) and the tongue lower surface (29); the tenon (13) having a tenon outer surface (33), a tenon inner contact surface (37), a tenon inner base corner (39) formed by a convergence of the tenon inner contact surface (37) and the male connector lower inner surface (41), and a tenon lowermost end (35) formed by a convergence of the tenon outer surface (33) and the tenon inner contact surface (37), the tenon lowermost end (35) being lower than the tongue lower surface (29) and higher than the bottom side (4) of the hard board (1); the male connector upper edge surface (17) extending upward from the tongue upper surface (21) to the top side (3) of the hard board (1); the tongue lower surface (29) extending upward from the bottom side (4) of the hard board (1) to the male connector lower inner surface (41); and the male connector lower inner surface (41) being located between the tenon inner base corner (39) and the male connector lower edge surface (45);

the female connector (10) protrudes from longitudinal sides of the second lateral side (6) and the fourth lateral side (8) of the hard board (1) forming an upper edge (51) and a lower edge (52) and comprises a tongue groove (12), a tenon groove (14), a female connector upper edge surface (18), a female connector lower edge surface (46), and a female connector outer edge surface (42); the tongue groove (12) having a tongue groove upper surface (22), a tongue groove end surface (26), and a tongue groove lower surface (30); the tenon groove (14) having a tenon groove inner surface (34), a tenon groove outer contact surface (38), a tenon groove outer base corner (40) formed by a convergence of the tenon groove outer contact surface (38) and the female connector outer edge surface (42), and a tenon groove lowermost end (36) formed by a convergence of the tenon groove inner surface (34) and the tenon groove outer contact surface (38), the tenon groove lowermost end (36) being lower than the tongue groove lower surface (30) and higher than the bottom side (4) of the hard board (1); the female connector upper edge surface (18) extending upward from the tongue groove upper surface (22) to the top side (3) of the hard board (1); the female connector lower edge surface (46) extending upward from the bottom side (4) of the hard board (1) to the female connector outer edge surface (42); the female connector outer edge surface (42) being located between the tenon groove outer base corner (40) and the female connector lower edge surface (46);

wherein the board with tongue and tenon can be assembled by horizontally laying said board with tongue and tenon and inserting a second board with tongue and tenon wherein a male connector (9) of the second board with tongue and tenon is inclined and inserted into the female connector (10) of said board with tongue and tenon such that the top sides (3) of said board with tongue and tenon and the second board with tongue and tenon flush when they are tightly joined;

wherein said insertion of the male connector (9) into the female connector (10) moves the tongue upper base corner (19) along a curve which is a part of a first ellipse (E1); moves the tongue lower end corner (27) along a curve which is a part of a second ellipse (E2); and moves the tenon lowermost end (35) or the tenon inner contact surface (37) while in contact with the tenon groove outer contact surface (38) along a curve which is a part of a third ellipse (E3) wherein the first ellipse (E1), the second ellipse (E2), and the third ellipse (E3) are concentric.

2. The board with tongue and tenon according to claim 1, wherein the tongue (11) protrudes from the first lateral side (5) and the third lateral side (7) for a distance "a" for insertion into the tongue groove (12).

3. The board with tongue and tenon according to claim 1, wherein the tongue groove (12) is indented from the second lateral side (6) and the fourth lateral side (8) for a distance "p" for accommodating the insertion of the tongue (11) and wherein the lower edge (52) is longer than the upper edge (51) for a distance "o".

4. The board with tongue and tenon according to claim 1, wherein the tenon (13) longitudinally convexly protrudes downward from the tongue lower surface (29) for a distance "d" in parallel with the length direction of the tongue (11) for insertion into the tenon groove (14).

5. The board with tongue and tenon according to claim 1, wherein the tenon groove (14) is longitudinally concavely indented for a distance "o" in parallel with the length direction of the tongue groove (12) for accommodating the insertion of the tenon (13).

6. The board with tongue and tenon according to claim 1, wherein the focal distances and the major axes of the first ellipse (E1), the second ellipse (E2), and the third ellipse (E3) are different.

7. The board with tongue and tenon according to claim 1, wherein when said board with tongue and tenon is tightly joined with the second board, a male connector upper edge corner (15) of said board will be in contact with a female connector upper edge corner (16) of the second board, the tongue upper surface (21) of said board will be in contact with the tongue groove upper surface (22) of the second board, the tenon lowermost end (35) of said board will be in contact with the tenon groove lowermost end (36) of the second board, and/or the tenon inner contact surface (37) of said board will be in contact with the tenon groove outer contact surface (38) of the second board.

8. The board with tongue and tenon according to claim 1, wherein when said board with tongue and tenon is tightly joined with the second board, the tenon lowermost end (35) of said board may be as high as or higher than the tenon groove lowermost end (36) of the second board.

9. The board with tongue and tenon according to claim 1, wherein when said board with tongue and tenon is tightly joined with the second board, a space will be formed between the tongue end surface (25) of said board and the tongue groove end surface (26) of the second board and between the tongue lower surface (29) of said board and the tongue groove lower surface (30) of the second board.

10. The board with tongue and tenon according to claim 1, wherein a part of the tongue groove lower surface (30) is in or not in a tangent line of the second ellipse (E2).

11. The board with tongue and tenon according to claim 1, wherein a tongue groove upper base corner (20) is concavely indented from the female connector upper edge surface (18) and the tongue groove upper surface (22).

12. The board with tongue and tenon according to claim 1, wherein the tongue upper base corner (19) is concavely indented from the male connector upper edge surface (17).

13. The board with tongue and tenon according to claim 1, wherein a tongue upper end corner (23) and/or the tongue lower end corner (27) is an inclined plane.

14. The board with tongue and tenon according to claim 1, wherein when said board with tongue and tenon is tightly joined with the second board, a space will be formed between the tenon outer surface (33) of said board and the tenon groove inner surface (34) of the second board.

15. The board with tongue and tenon according to claim 1, wherein at least a part of the tenon groove outer contact surface (38) is a part of the third ellipse (E3).

16. The board with tongue and tenon according to claim 1, wherein the hard board (1) is made from a material selected from the group consisting of plastic, plywood, lumber, finger joint laminated board, woodchip, hardboard, wood-plastic composite, non-metal and metal.

17. A method for manufacture of the board with tongue and tenon according to claim 1, comprising forming the tenon groove (14) on the hard board (1) using a first cutting tool set and forming the tongue groove (12) using a second cutting tool set which is independent from the first cutting tool set wherein the first cutting tool set's shafts are horizontally oriented and the second cutting tool set's shafts are vertically oriented.

* * * * *

UNITED STATES PATENT AND TRADEMARK OFFICE
CERTIFICATE OF CORRECTION

PATENT NO.        : 10,337,190 B2
APPLICATION NO.   : 16/058919
DATED             : July 2, 2019
INVENTOR(S)       : Ranat Tarananopas

Page 1 of 1

It is certified that error appears in the above-identified patent and that said Letters Patent is hereby corrected as shown below:

On the Title Page

Please add Item (30) Foreign Application Priority Data:
--"Sep. 8, 2017 (TH) ..... 1701005127"--

Signed and Sealed this
Second Day of June, 2020

Andrei Iancu
*Director of the United States Patent and Trademark Office*